June 18, 1929.  K. IMHOFF  1,717,780

SUBDIVIDED ACTIVATED SLUDGE SYSTEM FOR SEWAGE TREATMENT

Filed June 18, 1927

Witnesses:

Inventor:
Karl Imhoff

Patented June 18, 1929.

1,717,780

UNITED STATES PATENT OFFICE.

KARL IMHOFF, OF ESSEN, GERMANY.

SUBDIVIDED ACTIVATED SLUDGE SYSTEM FOR SEWAGE TREATMENT.

Application filed June 18, 1927, Serial No. 199,785, and in Germany April 26, 1926.

In the activated sludge system for sewage treatment, the sewage flows, first, through preliminary settling basins, which are mostly combined with sludge digestion chambers, then, through aeration tanks, and, finally through secondary settlers. In the latter, the activated sludge formed in the aeration tanks is eliminated and hence again pumped back into the aeration tanks through a continuous circulation (return sludge). As, however, the formation of activated sludge is continuously increased, part of the latter must be removed from the secondary settlers (excess sludge). It has recently been proposed to lead said excess sludge into the digestion chambers of the preliminary tanks and to digest and thus dispose of the same therein.

Said known process has, from the economical point of view, the following serious drawbacks:—

(1) The total quantity of the activated sludge must be well aerated and kept at its full activity, although it is obvious that the sludge of highest activity is required for the last step of the treatment only and that at the beginning of the treatment also activated sludge of lesser activity can be used.

(2) The excess sludge to be disturbed by digestion in the digestion chambers is supplied to the latter in well aerated condition and creates there difficulties during the digestion. For a satisfactory digestion it would be more recommendable to supply the excess sludge thereto in a less aerated condition. Thus, good aeration of the excess sludge, which is not more required for the treatment at all, results in unnecessary costs and in a disturbance of the digestion in the digestion chambers.

According to the present invention, said drawbacks are overcome by subdividing the total sludge activation plant or system into two or more groups and advancing the activated sludge in a countercurrent to and through the sewage in such a way that the most active and most sound sludge works first on the off-flow side and that the sludge with proceeding exhaustion of its activity travels to the inflow until it is supplied as a worn ill sludge to the digestion chambers of the preliminary tanks. In each group of such an improved plant or system, an aeration tank and a secondary settler are so connected that the return sludge circulates within said individual group only while the excess sludge from said group is brought into the next preceding group and the excess sludge of the first group only is supplied to the digestion chambers of the preliminary tanks.

Figure 1:
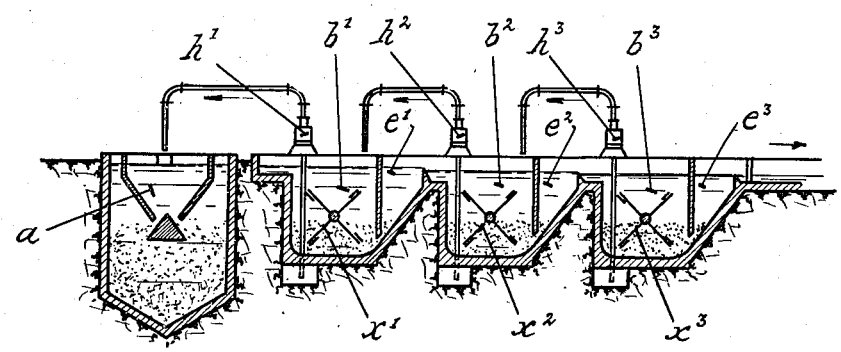
Figure 2:
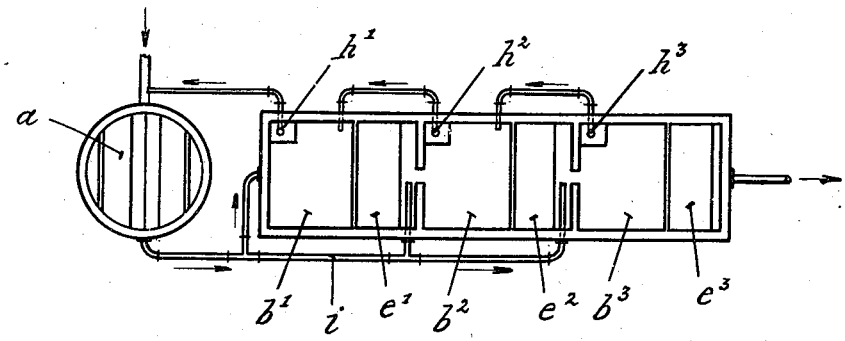

The accompanying drawing illustrates diagrammatically by way of example how the invention can be put into practice: Figs. 1 and 2 are respectively a longitudinal vertical section and a plan view of the improved plant or system.

The improved plant comprises a combined preliminary settling and digestion tank $a$ (Imhoff tank) and a sludge activation system consisting of three groups. Each individual group consists of an aeration tank $b^1$ ($b^2$, $b^3$) and a secondary settler $e^1$ ($e^2$, $e^3$) which are so connected that the return sludge from the secondary settler flows always automatically back into the aeration tank. In the aeration tanks, the aeration and agitation of the sludge takes place by means of stirring contrivances $x^1$ ($x^2$, $x^3$), of which the action can be increased by the inflation of air therein. The excess sludge is pumped from the third group through pump $h^3$ into the second group, hence through pump $h^2$ into the first group, and hence through pump $h^1$ into the digestion chamber of the preliminary tank $a$.

As shown in Figure 1 the aeration of separate tanks are in pairs and each pair comprises really a single receptacle or vessel with the aeration space separated from the settling space by a partition $p$ which terminates short of the bottom. One side of each of these vessels is sloping providing an inclined bottom for the settling tank which communicates with the bottom of the aeration tank under the partition $p$.

Thus, the excess sludge travels in a countercurrent to the sewage from the off-flow or effluent side to the inflow side.

The preliminary tank $a$ is connected with the individual groups by means of a pipe system $i$, whereby it is possible to disconnect one or the other group for some time if it is desired, for instance, to make the sludge therein particularly active by re-activation.

In operation the sewage passes from the aeration tank $b'$ and the settler $e'$ of the first stage, into the aeration tank and settler of the second stage, and thence into the aeration tank and settler of the third stage, but the return sludge in the settler of any one of the stages always flows into the aeration tank of the same stage. The excess sludge, however, of each stage is delivered to the aeration tank of the preceding stage. Thus the excess sludge travels through the system in a direction reverse to that of the sewage through the stages of the system and this weakened excess sludge finally reaches the preliminary settling and digestion tank *a*.

What I claim, is:—

1. In a system for treating sewage, a plurality of aeration tanks and settlers alternately arranged to receive and expose the sewage flow, said aeration tanks and settlers being countercurrent producing in stages by pairs comprising in the direction of sewage flow a tank and a settler through which the sewage is passed, each settler having a sloping bottom sloping to the tank of the same stage in a direction reverse to the direction of flow of the sewage, to provide for circulating return sludge in a countercurrent within the aeration tank of that stage.

2. A system for treatment of sewage comprising a plurality of aeration tanks and settlers arranged in pairs through which the sewage passes in stages, the aeration tank of one stage being connected to the aeration tank of the preceding stage to deliver excess sludge thereto.

3. A system for treating sludge comprising a plurality of aeration tanks and settlers through which the sludge is passed in stages, the settler of each stage being connected to the aeration tank of that stage to deliver return sludge thereto, and the aeration tank of one stage being connected to deliver excess sludge into the aeration tank of the preceding stage.

4. In a system for treating sewage, a plurality of aeration tanks and settlers alternately arranged to receive and expose the sewage flow, the aeration tanks and settlers being countercurrent producing in stages by pairs through which the sewage is passed, the settler of each stage receiving the sewage flow from the aeration tank of the same stage and having a sloping bottom sloping to the aeration tank of the same stage and in a direction reverse to the direction of flow of the sewage, the sloping bottoms of the settlers sloping downwardly to the bottoms of the aeration tanks and being of sufficient inclination to decant return sludge by stream flow action in a countercurrent within and from the bottoms of the aeration tanks.

5. In a system for treating sewage, a plurality of aeration tanks and settlers arranged in pairs, each pair comprising a single vessel with a space for the settler separated by a partition from the space for the aeration tank, the settler having a sloping bottom communicating beneath the partition with the bottom of the settling tank so that the return sludge of the settler of any stage is delivered to the aeration tank of that stage.

In testimony whereof I have hereunto set my hand.

KARL IMHOFF.